United States Patent
Wentink

(10) Patent No.: US 10,014,979 B2
(45) Date of Patent: Jul. 3, 2018

(54) METHODS AND APPARATUS FOR AVOIDING COLLISIONS DUE TO HIDDEN WIRELESS NODES

(71) Applicant: QUALCOMM Incorporated, San Diego, CA (US)

(72) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 1227 days.

(21) Appl. No.: 13/770,423

(22) Filed: Feb. 19, 2013

(65) Prior Publication Data

US 2014/0133408 A1 May 15, 2014

Related U.S. Application Data

(60) Provisional application No. 61/725,660, filed on Nov. 13, 2012.

(51) Int. Cl.

| | |
|---|---|
| *H04L 12/64* | (2006.01) |
| *H04L 12/06* | (2006.01) |
| *H04L 5/00* | (2006.01) |
| *H04B 7/0452* | (2017.01) |
| *H04L 1/00* | (2006.01) |
| *H04L 1/06* | (2006.01) |
| *H04L 1/18* | (2006.01) |

(52) U.S. Cl.
CPC .............. *H04L 1/0061* (2013.01); *H04L 1/06* (2013.01); *H04L 1/1848* (2013.01); *H04L 5/0023* (2013.01); *H04L 12/6418* (2013.01); *H04B 7/0452* (2013.01)

(58) Field of Classification Search
CPC ............... H04B 7/0452; H04B 7/0697; H04W 74/0808; H04L 1/1854; H04L 5/0062
See application file for complete search history.

(56) References Cited

U.S. PATENT DOCUMENTS

| | | | |
|---|---|---|---|
| 6,256,478 B1 | 7/2001 | Allen et al. | |
| 7,376,111 B2 | 5/2008 | Moreton | |
| 7,526,705 B2 | 4/2009 | Boer et al. | |
| 8,014,818 B2* | 9/2011 | Grandhi et al. | ........... 455/552.1 |
| 8,359,065 B2* | 1/2013 | Grandhi et al. | ........... 455/552.1 |

(Continued)

*Primary Examiner* — Ayaz Sheikh
*Assistant Examiner* — Debebe Asefa
(74) *Attorney, Agent, or Firm* — Patterson & Sheridan, LLP

(57) ABSTRACT

Certain aspects of the present disclosure provide techniques and apparatus for starting an extended idle interval in an effort to avoid collisions with transmissions from hidden wireless nodes. One example apparatus generally includes a receiver and a processing system. The receiver is typically configured to receive a multi-user (MU) transmission comprising at least one packet for the apparatus. The processing system is typically configured to determine a checksum of the at least one packet and to start an idle interval associated with the apparatus after receiving the MU transmission if the at least one packet comprises a frame check sequence (FCS) that corresponds to the checksum, wherein the idle interval includes at least enough time for transmission of an acknowledgment (ACK) frame. For certain aspects, the idle interval may comprise an extended interframe space (EIFS).

32 Claims, 4 Drawing Sheets

(56) References Cited

U.S. PATENT DOCUMENTS

| | | | |
|---|---|---|---|
| 8,553,628 B2* | 10/2013 | Jin et al. | 370/329 |
| 8,594,007 B2* | 11/2013 | Wentink | 370/312 |
| 8,842,646 B2* | 9/2014 | Sekiya et al. | 370/338 |
| 8,897,209 B2* | 11/2014 | Wentink et al. | 370/322 |
| 8,909,286 B2* | 12/2014 | Grandhi et al. | 455/552.1 |
| 8,923,217 B2* | 12/2014 | Liu et al. | 370/329 |
| 2004/0095911 A1* | 5/2004 | Benveniste | H04L 47/14 |
| | | | 370/338 |
| 2009/0232061 A1 | 9/2009 | Rajamani et al. | |
| 2011/0222408 A1 | 9/2011 | Kasslin et al. | |
| 2014/0079016 A1* | 3/2014 | Dai | H04L 5/0041 |
| | | | 370/330 |

* cited by examiner

METHODS AND APPARATUS FOR AVOIDING COLLISIONS DUE TO HIDDEN WIRELESS NODES

CROSS-REFERENCE TO RELATED APPLICATIONS

This application claims benefit of U.S. Provisional Patent Application Ser. No. 61/725,660, filed Nov. 13, 2012, which is herein incorporated by reference.

BACKGROUND

Field of the Invention

Certain aspects of the present disclosure generally relate to wireless communications and, more particularly, to avoiding collisions due to hidden wireless nodes.

Relevant Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO wireless system employs a number ($N_T$) of transmit antennas and a number ($N_R$) of receive antennas for data transmission. A MIMO channel formed by the $N_T$ transmit and $N_R$ receive antennas may be decomposed into a number ($N_S$) of independent channels, which are also referred to as spatial channels or spatial streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single access point (AP) and multiple user stations (STAs), concurrent transmissions may occur on multiple channels toward different stations, both in the uplink and downlink direction. Many challenges are present in such systems.

SUMMARY

Certain aspects of the present disclosure generally relate to avoiding collisions among stations (STAs) by having a STA—after receiving a multi-user (MU) transmission intended for the STA, but who is instructed to send no immediate response to the MU transmission—start an idle interval (e.g., an Extended Interframe Spacing (EIFS)).

Certain aspects of the present disclosure provide an apparatus for wireless communications. The apparatus generally includes a receiver and a processing system. The receiver is typically configured to receive an MU transmission comprising at least one packet for the apparatus. The processing system is typically configured to determine a checksum of the at least one packet and to start an idle interval associated with the apparatus after receiving the MU transmission if the at least one packet comprises a frame check sequence (FCS) that corresponds to the checksum, wherein the idle interval includes at least enough time for transmission of an acknowledgment (ACK) frame.

Certain aspects of the present disclosure provide a method for wireless communications. The method generally includes receiving, at an apparatus, an MU transmission comprising at least one packet for the apparatus; determining a checksum of the at least one packet; and starting an idle interval associated with the apparatus after receiving the MU transmission if the at least one packet comprises an FCS that corresponds to the checksum, wherein the idle interval includes at least enough time for transmission of an ACK frame.

Certain aspects of the present disclosure provide an apparatus for wireless communications. The apparatus generally includes means for receiving an MU transmission comprising at least one packet for the apparatus, means for determining a checksum of the at least one packet, and means for starting an idle interval associated with the apparatus after receiving the MU transmission if the at least one packet comprises an FCS that corresponds to the checksum, wherein the idle interval includes at least enough time for transmission of an ACK frame.

Certain aspects of the present disclosure provide a computer-program product for wireless communications. The computer-program product generally includes a computer-readable medium having instructions executable to receive, at an apparatus, an MU transmission comprising at least one packet for the apparatus; to determine a checksum of the at least one packet; and to start an idle interval associated with the apparatus after receiving the MU transmission if the at least one packet comprises an FCS that corresponds to the checksum, wherein the idle interval includes at least enough time for transmission of an ACK frame.

Certain aspects of the present disclosure provide a wireless node. The wireless node generally includes at least one antenna, a receiver, and a processing system. The receiver is typically configured to receive, via the at least one antenna, an MU transmission comprising at least one packet for the wireless node. The processing system is typically configured to determine a checksum of the at least one packet and to start an idle interval associated with the wireless node after receiving the MU transmission if the at least one packet comprises an FCS that corresponds to the checksum, wherein the idle interval includes at least enough time for transmission of an ACK frame.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
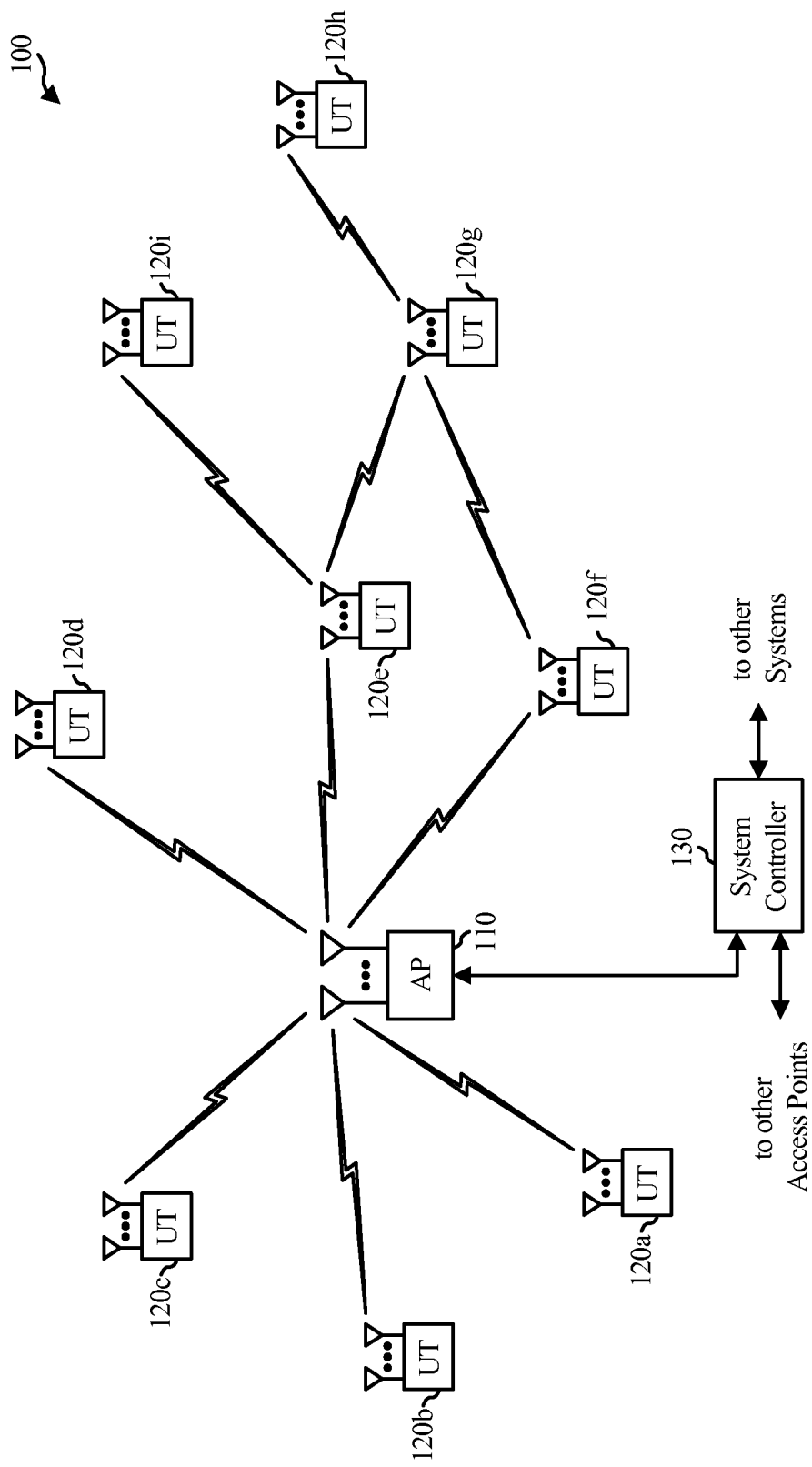
FIG. 1 illustrates a diagram of an example wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support the Institute of Electrical and Electronics Engineers (IEEE) 802.11n or earlier amendments to the IEEE 802.11 standard.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to a different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point (AP) may comprise, be implemented as, or known as a Node B, Radio Network Controller (RNC), evolved Node B (eNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

An access terminal (AT) may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol (SIP) phone, a wireless local loop (WLL) station, a personal digital assistant (PDA), a handheld device having wireless connection capability, a station (STA), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station (MS), a station (STA), a client, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to a different user terminal 120.

Figure 2:
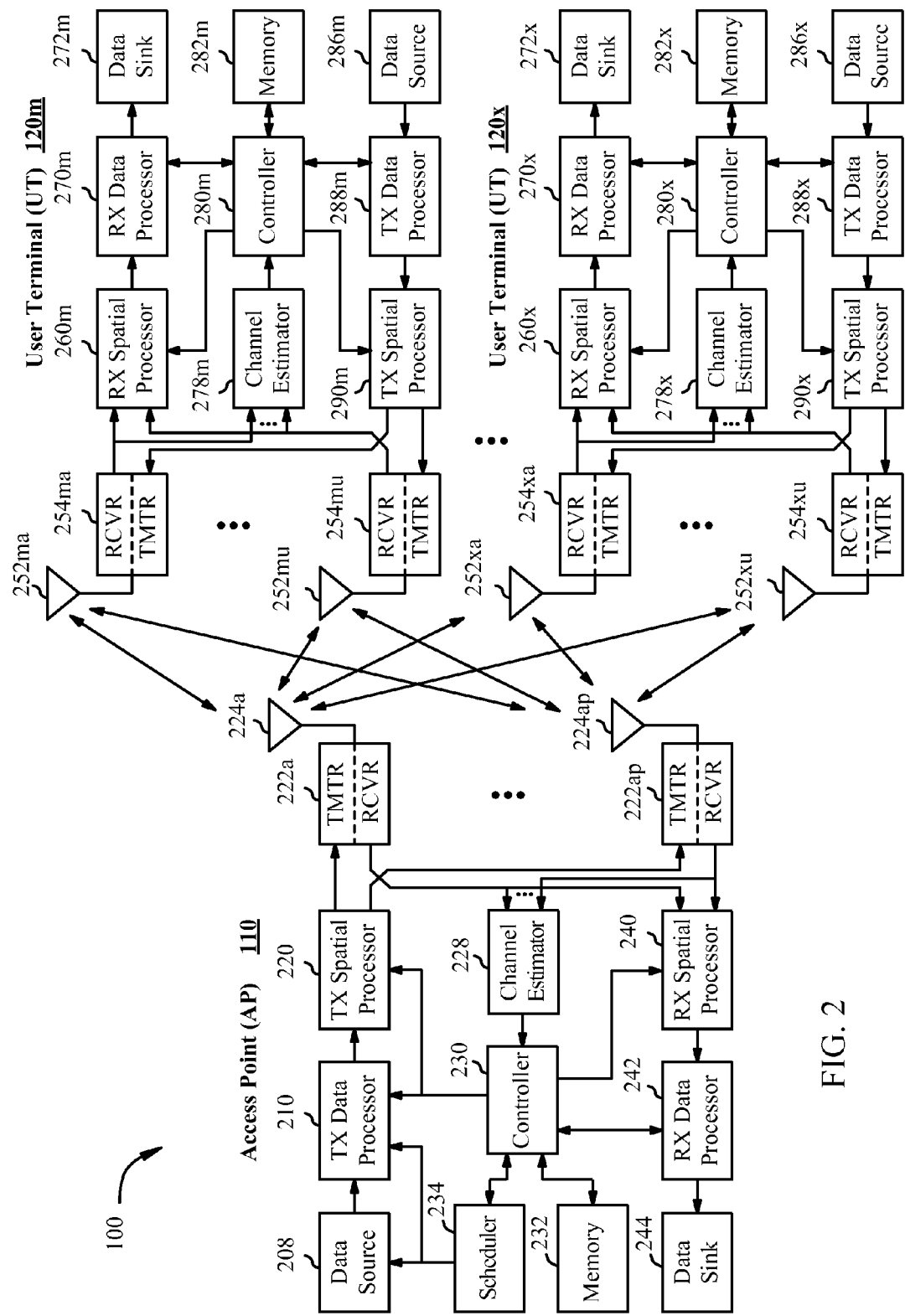
FIG. 2 illustrates a block diagram of an example access point (AP) and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ signals for transmission from $N_{ut,m}$ antennas 252 to the access point 110.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as precoding or beamforming) on the $N_{dn}$ downlink data symbol streams and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves, and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

In next generation WLANs, such as the MIMO system 100 from FIG. 1, downlink DL) multi-user (MU) MIMO transmission may represent a promising technique to increase overall network throughput. In most aspects of a DL MU-MIMO transmission, a non-beamformed portion of a preamble transmitted from an access point to a plurality of user stations (STAs) may carry a spatial stream allocation field indicating allocation of spatial streams to the STAs.

In order to parse this allocation information at a STA, each STA may be informed of its ordering or a STA number in a set of STAs from the plurality of STAs scheduled to receive the MU transmission. This may entail forming groups, wherein a group identifier (group ID) field in the preamble may convey, to the STAs, the set of STAs (and their order) being transmitted in a given MU transmission. With preamble bits adding to the transmission overhead, it may be desirable to expend as little bits on the group ID as possible, while not sacrificing on the flexibility with which STAs can be scheduled together in a MU-MIMO transmission at a given instant.

An Example Hidden Node Protection Mechanism

A multi-user (MU) transmission is a physical layer (PHY) protocol data unit (PPDU) that contains unicast Media Access Control (MAC) protocol data units (MPDUs) destined for multiple STAs. Such MU transmission is made possible by multi-user multiple input multiple output (MU-MIMO), as defined in the IEEE 802.11ac amendment to the IEEE 802.11 standard. A typical MU PPDU invites one recipient STA to send an immediate response, while the other recipient STAs are instructed to send no immediate response to the MU PPDU. These STAs may be referred to as the non-immediate responder recipient STAs of the MU transmission (the "non-responders" for short).

A non-responder will receive MPDUs with a matching Receiver Address (RA) and a Frame Check Sequence (FCS) that checks out (e.g., the MPDU comprises an FCS that matches a determined checksum of this MPDU). Because of the matching RA, the non-responder does not update its Network Allocation Vector (NAV). In addition, due to the checking FCS, the non-responder conventionally does not start an Extended Interframe Space (EIFS) after receiving the MU PPDU. This implies that non-responders may send transmissions that collide with the immediate response when the STA sending the immediate response is hidden from the non-responder.

STAs that are not recipients of the MU packet will likely not be able to decode any of the PPDU's contents, which implies that non-recipients will start an EIFS after the MU packet. Therefore, to put all STAs—except the one sending the immediate response—on the same footing, STAs that receive, as part of an MU transmission, a correct MPDU (i.e., with a checking FCS) which does not solicit an immediate response start an EIFS according to aspects of the present disclosure. A similar effect may be achieved by having all STAs that receive (part of) an MU PPDU start an EIFS, with the understanding that transmitting an immediate response will reset the EIFS.

Figure 3:
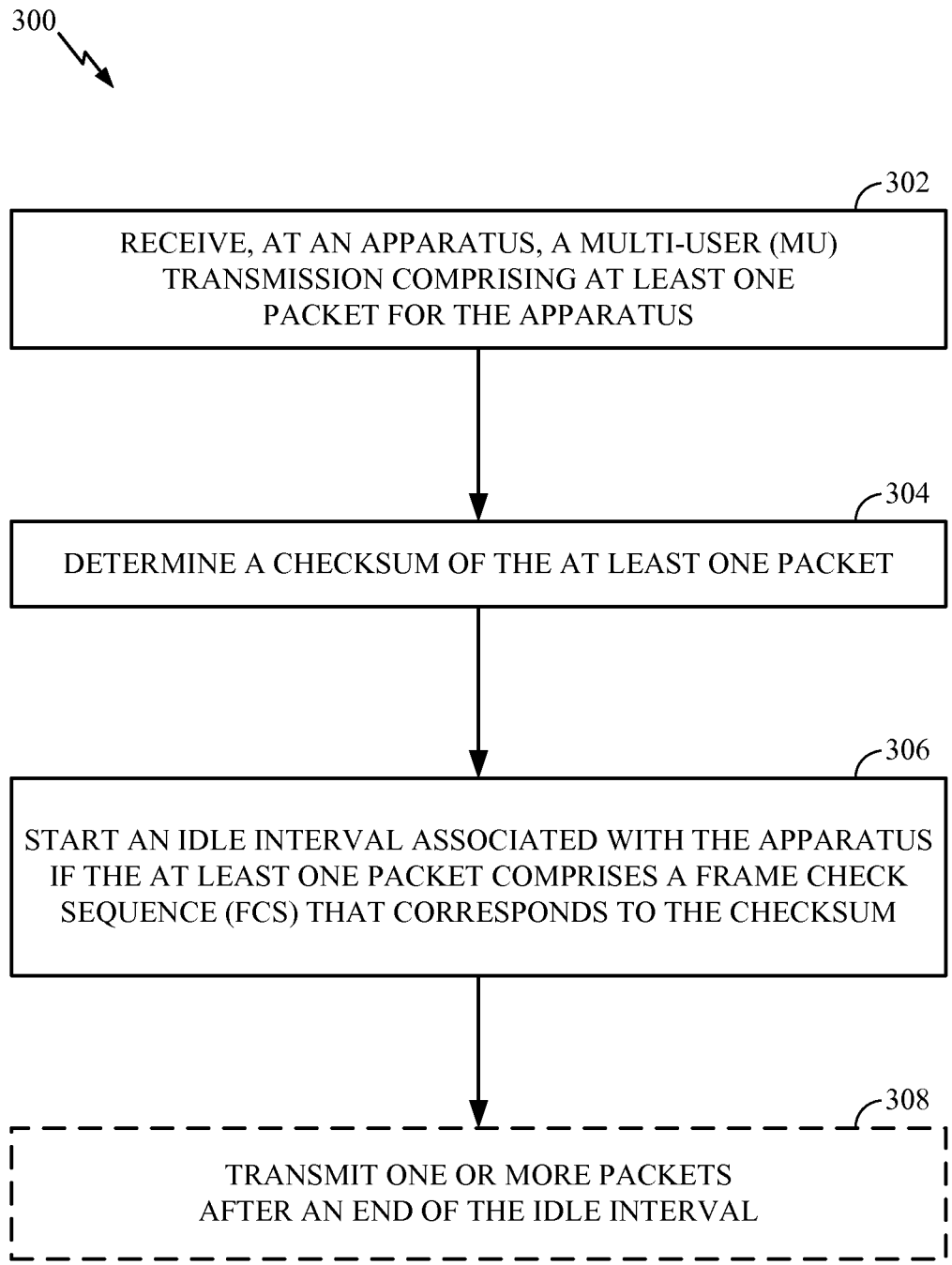
FIG. 3 illustrates example operations—from the perspective of an apparatus, such as a station (STA) or user terminal—for starting an extended idle interval if a checksum of a packet in a multi-user (MU) transmission corresponds to a frame check sequence (FCS) associated with the packet, in accordance with certain aspects of the present disclosure.

FIG. 3 illustrates example operations 300 for starting an extended idle interval in an effort to avoid collisions with transmissions from hidden wireless nodes. The operations 300 may be performed by an apparatus, such as a STA or user terminal, in accordance with certain aspects of the present disclosure. The apparatus may be a non-responder STA, as defined above.

The operations 300 may begin, at 302, with the apparatus receiving a multi-user (MU) transmission comprising at least one packet for the apparatus. According to certain aspects, the MU transmission indicates that the apparatus is not to transmit a response to the MU transmission. At 304, the apparatus may determine a checksum of the at least one packet.

At 306, the apparatus may start an idle interval associated with the apparatus after receiving the MU transmission if the at least one packet comprises a frame check sequence (FCS) that corresponds to (e.g., matches) the checksum. The idle interval includes at least enough time for transmission of an acknowledgment (ACK) frame. For certain aspects, the idle interval is an extended interframe space (EIFS).

At 308, the apparatus may, for certain aspects, transmit one or more packets after an end of the idle interval. For certain aspects, the apparatus may refrain from transmitting a packet during the idle interval to reduce potential interference with a transmission, from another apparatus, in response to the MU transmission.

According to certain aspects, the apparatus may receive, from another apparatus (e.g., a responder STA), a response to the MU transmission. The apparatus may restart the idle interval after receiving the response. In other words, a transmission (e.g., an ACK frame), from another apparatus, in response to the MU transmission may reset the idle interval.

According to certain aspects, the at least one packet may include at least one media access control (MAC) protocol data unit (MPDU). For certain aspects, the at least one MPDU may include a field indicating a No Ack policy, a No Explicit Ack policy, a power save multi-poll (PSMP) Ack policy, or a Block Ack policy. This field (or some combination of the field and other elements in the MU transmission) may indicate that the apparatus is not to transmit a response to the MU transmission. For certain aspects, the at least one MPDU may include a field indicating an Ack policy different from a Normal Ack policy or an Implicit Block Ack Request policy. For other aspects, the at least one MPDU comprises a field indicating a normal Ack policy or an Implicit Block Ack Request policy. These Ack policies are described in the IEEE 802.11n™-2009 standard, for example.

Figure 3A:
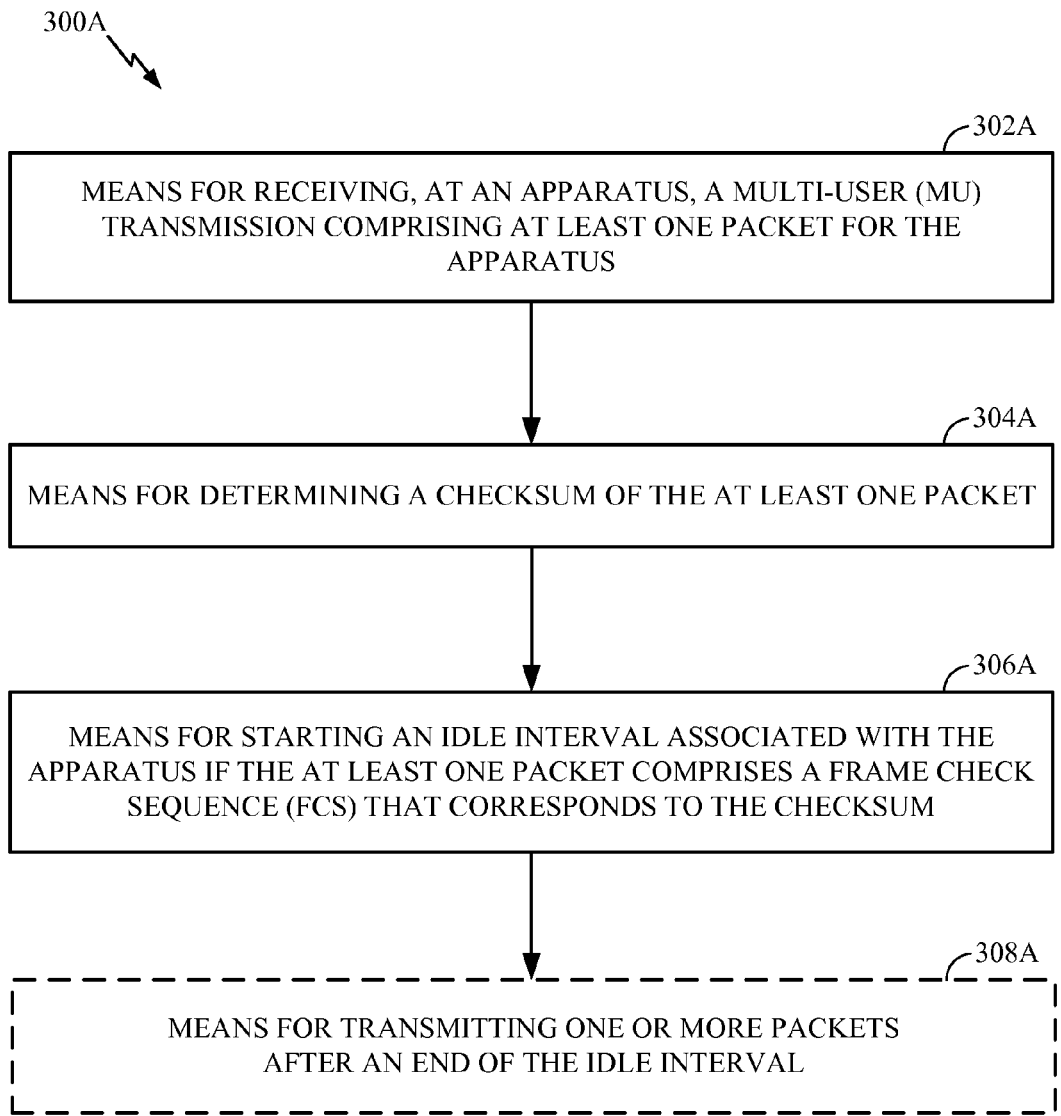
FIG. 3A illustrates example means capable of performing the operations shown in FIG. 3.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 300 illustrated in FIG. 3 correspond to means 300A illustrated in FIG. 3A.

For example, means for transmitting or means for refraining may comprise a transmitter, such as the transmitter unit 254 of the user terminal 120 depicted in FIG. 2 shown in FIG. 2. Means for receiving may comprise a receiver, such as the receiver unit 254 of the user terminal 120 depicted in FIG. 2. Means for processing, means for starting, means for refraining, means for restarting, or means for determining may comprise a processing system, which may include one or more processors, such as the RX data processor 270, the TX data processor 288, and/or the controller 280 of the user terminal 120 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
a receiver configured to receive a multi-user (MU) transmission comprising at least one packet for the apparatus; and
a processing system configured to:
determine a checksum of the at least one packet; and
start an idle interval associated with the apparatus after receiving the MU transmission if the at least one packet comprises a frame check sequence (FCS) that corresponds to the checksum, wherein the idle interval includes at least enough time for transmission of an acknowledgment (ACK) frame.

2. The apparatus of claim 1, wherein the idle interval comprises an extended interframe space (EIFS).

3. The apparatus of claim 1, further comprising a transmitter configured to refrain from transmitting a packet during the idle interval to reduce potential interference with a transmission, from another apparatus, in response to the MU transmission.

4. The apparatus of claim 1, further comprising a transmitter configured to transmit one or more packets after an end of the idle interval.

5. The apparatus of claim 1, wherein the MU transmission indicates that the apparatus is not to transmit a response to the MU transmission.

6. The apparatus of claim 1, wherein the receiver is configured to receive, from another apparatus, a response to the MU transmission and wherein the processing system is configured to restart the idle interval after receiving the response.

7. The apparatus of claim 1, wherein the at least one packet comprises at least one media access control (MAC) protocol data unit (MPDU).

8. The apparatus of claim 7, wherein the at least one MPDU comprises a field indicating a No Ack policy, a No Explicit Ack policy, a power save multi-poll (PSMP) Ack policy, or a Block Ack policy, wherein the field indicates that the apparatus is not to transmit a response to the MU transmission.

9. The apparatus of claim 7, wherein the at least one MPDU comprises a field indicating an Ack policy different from a Normal Ack policy or an Implicit Block Ack Request policy, wherein the field indicates that the apparatus is not to transmit a response to the MU transmission.

10. The apparatus of claim 7, wherein the at least one MPDU comprises a field indicating a normal Ack policy or an Implicit Block Ack Request policy, wherein the field indicates that the apparatus is not to transmit a response to the MU transmission.

11. A method for wireless communications, comprising:
receiving, at an apparatus, a multi-user (MU) transmission comprising at least one packet for the apparatus;
determining a checksum of the at least one packet; and
starting an idle interval associated with the apparatus after receiving the MU transmission if the at least one packet comprises a frame check sequence (FCS) that corresponds to the checksum, wherein the idle interval includes at least enough time for transmission of an acknowledgment (ACK) frame.

12. The method of claim 11, wherein the idle interval comprises an extended interframe space (EIFS).

13. The method of claim 11, further comprising refraining from transmitting a packet during the idle interval to reduce potential interference with a transmission, from another apparatus, in response to the MU transmission.

14. The method of claim 11, further comprising transmitting one or more packets after an end of the idle interval.

15. The method of claim 11, wherein the MU transmission indicates that the apparatus is not to transmit a response to the MU transmission.

16. The method of claim 11, further comprising:
receiving, from another apparatus, a response to the MU transmission; and
restarting the idle interval after receiving the response.

17. The method of claim 11, wherein the at least one packet comprises at least one media access control (MAC) protocol data unit (MPDU).

18. The method of claim 17, wherein the at least one MPDU comprises a field indicating a No Ack policy, a No Explicit Ack policy, a power save multi-poll (PSMP) Ack policy, or a Block Ack policy, wherein the field indicates that the apparatus is not to transmit a response to the MU transmission.

19. The method of claim 17, wherein the at least one MPDU comprises a field indicating an Ack policy different from a Normal Ack policy or an Implicit Block Ack Request policy, wherein the field indicates that the apparatus is not to transmit a response to the MU transmission.

20. The method of claim 17, wherein the at least one MPDU comprises a field indicating a normal Ack policy or an Implicit Block Ack Request policy, wherein the field indicates that the apparatus is not to transmit a response to the MU transmission.

21. An apparatus for wireless communications, comprising:
means for receiving a multi-user (MU) transmission comprising at least one packet for the apparatus;
means for determining a checksum of the at least one packet; and
means for starting an idle interval associated with the apparatus after receiving the MU transmission if the at least one packet comprises a frame check sequence (FCS) that corresponds to the checksum, wherein the idle interval includes at least enough time for transmission of an acknowledgment (ACK) frame.

22. The apparatus of claim 21, wherein the idle interval comprises an extended interframe space (EIFS).

23. The apparatus of claim 21, further comprising means for refraining from transmitting a packet during the idle interval to reduce potential interference with a transmission, from another apparatus, in response to the MU transmission.

24. The apparatus of claim 21, further comprising means for transmitting one or more packets after an end of the idle interval.

25. The apparatus of claim 21, wherein the MU transmission indicates that the apparatus is not to transmit a response to the MU transmission.

26. The apparatus of claim 21, further comprising:
means for receiving, from another apparatus, a response to the MU transmission; and
means for restarting the idle interval after receiving the response.

27. The apparatus of claim 21, wherein the at least one packet comprises at least one media access control (MAC) protocol data unit (MPDU).

28. The apparatus of claim 27, wherein the at least one MPDU comprises a field indicating a No Ack policy, a No Explicit Ack policy, a power save multi-poll (PSMP) Ack policy, or a Block Ack policy, wherein the field indicates that the apparatus is not to transmit a response to the MU transmission.

29. The apparatus of claim 27, wherein the at least one MPDU comprises a field indicating an Ack policy different from a Normal Ack policy or an Implicit Block Ack Request policy, wherein the field indicates that the apparatus is not to transmit a response to the MU transmission.

30. The apparatus of claim 27, wherein the at least one MPDU comprises a field indicating a normal Ack policy or an Implicit Block Ack Request policy, wherein the field indicates that the apparatus is not to transmit a response to the MU transmission.

31. A non-transitory computer-readable medium comprising instructions executable to:
receive, at an apparatus, a multi-user (MU) transmission comprising at least one packet for the apparatus;
determine a checksum of the at least one packet; and
start an idle interval associated with the apparatus after receiving the MU transmission if the at least one packet comprises a frame check sequence (FCS) that corresponds to the checksum, wherein the idle interval includes at least enough time for transmission of an acknowledgment (ACK) frame.

32. A wireless node, comprising:
at least one antenna;
a receiver configured to receive, via the at least one antenna, a multi-user (MU) transmission comprising at least one packet for the wireless node; and
a processing system configured to:
determine a checksum of the at least one packet; and
start an idle interval associated with the wireless node after receiving the MU transmission if the at least one packet comprises a frame check sequence (FCS) that corresponds to the checksum, wherein the idle interval includes at least enough time for transmission of an acknowledgment (ACK) frame.

* * * * *